United States Patent
Onishi

[15] 3,680,335
[45] Aug. 1, 1972

[54] SAFETY DEVICE CONTROLLING VEHICLE LOCKING

[72] Inventor: Takekazu Onishi, Nagoya, Japan
[73] Assignee: Kabushiki-Kaisha Tokai Rika Denki Seisakusho, Aichi-ken, Japan
[22] Filed: March 23, 1971
[21] Appl. No.: 127,274

[30] Foreign Application Priority Data
April 3, 1970 Japan..........................45/32762

[52] U.S. Cl. .......................70/252, 70/282, 180/111
[51] Int. Cl......B60r 25/02, E05b 63/18, E05b 47/06
[58] Field of Search........70/239, 243, 248, 250, 251, 70/252, 254, 255, 257, 282; 180/111

[56] References Cited

UNITED STATES PATENTS

| | | | |
|---|---|---|---|
| 1,653,549 | 12/1927 | Corey | 70/248 |
| 1,675,465 | 7/1928 | Roehrich | 70/252 X |
| 1,805,088 | 5/1931 | Hardesty | 70/251 |
| 2,475,220 | 7/1949 | Chaulk et al. | 70/239 X |
| 3,380,549 | 4/1968 | Hille | 70/254 |
| 3,610,004 | 10/1971 | Neese | 70/248 |
| 3,613,412 | 10/1971 | Yamaguchi | 70/252 |

FOREIGN PATENTS OR APPLICATIONS

| | | | |
|---|---|---|---|
| 340,688 | 9/1921 | Germany | 70/252 |
| 936,251 | 12/1955 | Germany | 70/252 |
| 1,277,688 | 9/1968 | Germany | 70/252 |

*Primary Examiner*—Albert G. Craig, Jr.
*Attorney*—Shlesinger, Fitzsimmons & Shlesinger

[57] ABSTRACT

An improvement in theft preventing devices having a rotor of lock of the cylinder type by means of which the ignition switch is settable to various positions and a locking bolt which is protrusible by the rotation of rotor to the locking position to block a vital part of vehicle such as a steering shaft, in which said improvement lies in that said locking bolt is not protrusible unless an electromagnetically operable means acting on the locking bolt to keep said bolt to its retracted position is actuated, whereby the accidental locking of the vital part of vehicle during the driving of the vehicle is positively prevented.

4 Claims, 3 Drawing Figures

INVENTOR
Takekasu Onishi

BY Shlesinger, Fitzsimmons & Shlesinger.
ATTORNEY

BEST AVAILABLE COPY 3,680,335

SAFETY DEVICE CONTROLLING VEHICLE LOCKING

This invention relates to theft preventing devices for motor vehicles, and more particularly to theft preventing devices for motor vehicles of the kind in which a locking bolt of a lock of the cylinder type provided with an ignition switch which is operable with the rotation of rotor of the lock, is brought into a protruded position, with the rotation of the rotor into a locking position, where the locking bolt is brought into the locking engagement with a vital part of automobiles such as a steering shaft, resulting in disabling the manipulation of said steering shaft.

The principal construction of the present invention lies in providing to a theft preventing device of the kind mentioned above with an electromagnetically operable means which is engageable with the locking bolt so as to positively hold said bolt at tis retracted position where it is not engageable with the steering shaft, the engagement of said means with the locking bolt being releasable only by the positive operation of a switch connected to an energizing circuit of an electromagnetic device which actuates the electromagnetically operable means, and said switch being such one which is closed only with the opening of a door of automobiles or with the positive closing thereof by a driver.

The above-mentioned electromagnetically operable means in accordance with the present invention which is operable only when a driver leaves automobiles, could be employed to almost all kinds of those conventional theft preventing devices, locking bolt of which is protruded into the rotary path of movement of a steering shaft, with the rotation of rotor thereof into a locking position, so as to make it impossible to manipulate the steering shaft.

The present invention may provide an improved theft preventing device in a motor vehicle, in which an accidental rotation of a rotor to its stop or lock position which renders a locking bolt active to make its locking engagement with a vital lockable part of the vehicle and will bring about a traffic accident if such occurs during the running of the vehicle, is positively prevented.

Preferred embodiments of the present invention are illustrated in the accompanying drawing in which.

Figure 1:
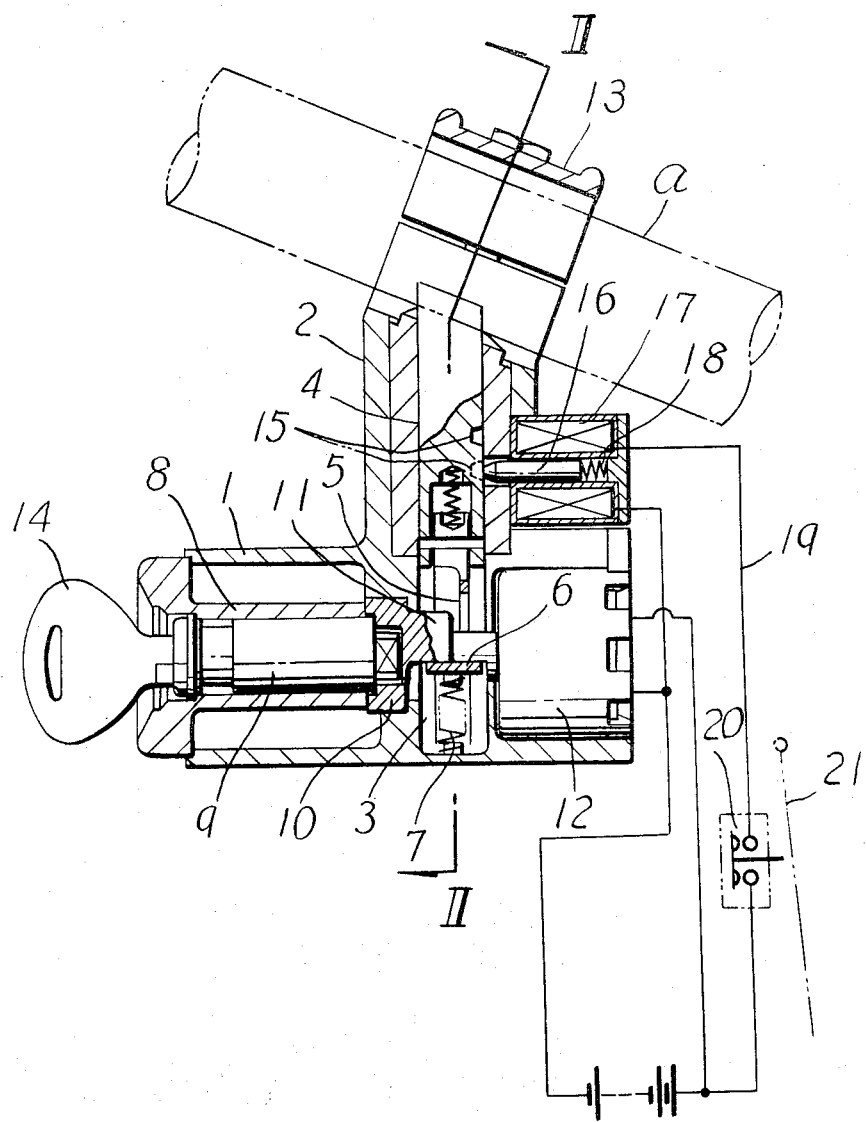
FIG. 1 is an explanatory side sectional view of one of conventional theft preventing devices, provided with an electromagnetically operable means in accordance with the present invention and a circuit including a switch thereof which actuates said means.
Figure 2:
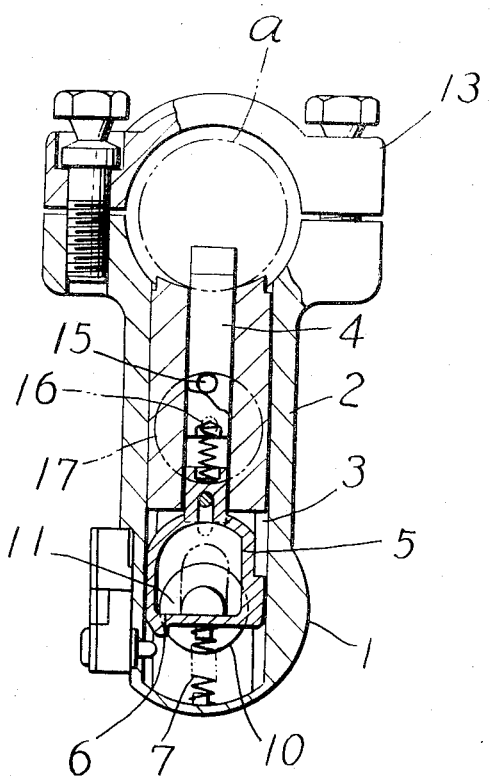
FIG. 2 is a sectional view of the device taken along the line II—II in FIG. 2.

An example of conventional anti-theft device for automobiles in which the present invention electromagnetically operable pin is adoptable, is illustrated in FIGS. 1 and 2, wherein a housing 1 of a theft preventing device has a branch housing 2 which extends from the housing 1 transversely thereto so as to embrace at its forward end a steering shaft $a$ of a motor vehicle. Numeral 8 indicates generally a lock of the cylinder type which is insertedly fitted to the end opening of the housing 1, and which comprises a rotor 9 fitted to the lock 8 so as to be rotatable by a key 14. To the forward end of the branch housing 2, there is provided, as best shown in FIG. 2, a holder 13 which is fitted by screws to said branch housing so as to rigidly connect, in cooperation with said forward end of the branch housing, said housing 2 to a steering column of the steering shaft $a$. A locking bolt 4 having a forward end which is engageable with the shaft $a$ for effecting locking engagement therewith upon movement of the bolt 4 into a protruded position, is accommodated in the housing 1 slideably in the transverse direction thereof and also slideable through the branch housing 2 in the axial direction thereof, being guided by a pair of grooves 3 each provided in the housing 1 parallel with the branch housing 2. Said locking bolt 4 is provided, at its rear end which moves within the housing 1 transversely thereto, with a slot 5 having a linear end surface 6, and is urged by a spring 7 towards the steering shaft $a$.

To the inner end of rotor 9, there is connected a rotary member 10 which is movable integrally with the rotation of the rotor. Said rotary member comprises a cylindrical head portion of a reduced diameter which is located remotely from the rotor and adjacently to a switch 12 and connected to a movable contact (not shown) of said switch for setting the electric circuit of the motor vehicle in various conditions in response to the rotation of rotor, and a neck portion 11 located between the base portion of rotary member and cylindrical head portion and provided at one side thereof with a flat surface extending substantially in parallel to the axes of the rotary member 10 and head portion thereof and at a side opposite to said one side with a semicircular cam face. Said neck portion 11 with the semicircular cam face engages with the locking bolt at the linear end surface 6 of slot 5.

In the theft preventing device of the above constructions, when the rotor 9 is rotated to its locking position, the flat surface of neck portion 11 of rotary member 10 comes into contact with the linear end surface 6 of slot 5 of locking bolt, as illustrated in FIGS. 1 and 2, thereby allowing the locking bolt 4 to move to its protruded position under the action of spring 7, effecting locking engagement between the forward end of locking bolt and the steering shaft $a$, and making it impossible to manipulate said shaft. On the other hand, when the rotor is rotated from its locking position to a certain angular distance, the locking bolt 4 is pressed, against the spring 7, being engaged at its linear end surface 6 by the semicircular cam face of neck portion 11 of rotary member 10, whereby the forward end of locking bolt is retracted into the branch housing 2 and said end is disengaged from the steering shaft $a$. In addition to the above constructions which can prevent motor vehicles from theft, it is also known that in order to prevent the locking bolt from protruding by accident during the running of vehicles, said bolt is only protrusible upon the rotation of rotor to its locking position and subsequent withdrawal of key from the rotor.

The theft preventing device having the above constructions and functions is, as aforementioned, an example of conventional devices of the kind, and it shall be noted that an accidental lock preventing device which shall be explained in the following, is not only applicable to the specific theft preventing device explained above with reference to the accompanying drawing, especially FIGS. 1 and 2 thereof, but also is employable in other conventional devices of the kind.

While it shall be very rare that a key inserted into the rotor and rotated and kept in a drive position happens to rotate accidentally to a locking position and moreover comes off from the rotor, nobody can say that such accidental movement of key shall never happen. Such worse movement of key is expected to happen, for example, through mischief by a child or a shock given to the key on a collision of vehicles. Hence, it is most desirable to provide theft preventing devices of the kind mentioned above with such an accidental lock preventing device which can never allow the locking bolt 4 to protrude into the rotary path of movement of steering shaft $a$ during the running of vehicles.

Such accidental lock preventing device in accordance with the present invention comprises an electromagnetically operable pin 16 which is normally urged by a spring 18 towards the locking bolt 4 so as to engage with a recess 15 provided to the bolt. The engagement between said pin and said recess is held whenever the rotor 9 is rotated to any position other than its locking position, or in other words, whenever the locking bolt 4 is pressed against the spring 7, being engaged at its linear end surface 6 by the semicircular cam face of neck portion 11 of rotary member 10, whereby the forward end of locking bolt is retracted into the branch housing 2 and said end is disengaged from the steering shaft $a$. Said accidental lock preventing device further comprises an electromagnetic device such as a solenoid 17 which is mounted on the outer wall of branch housing 2 at such a position where it can slideably accommodate therein the electromagentically operable pin 16 as a plunger and iron core thereof. Said solenoid 17 connected to a solenoid circuit 19 having a switch 20 is normally not energized and allows the electromagnetically operable pin 16 to protrude towards the locking bolt by means of the spring 18 so as to keep said bolt to its retracted position by its engagement with the recess 15 of the bolt 4 even when the rotor is rotated to its locking position and/or the key is withdrawn from the rotor. The solenoid 17 is energized to release the engagement of the pin 16 with the recess 15 only when the solenoid circuit 19 is closed by the switch 20 in response to the opening of a door 21 which is located adjacently to a driver's seat.

In the above constructions, even when the rotor 9 is rotated to its locking position and/or the key 14 is withdrawn from the rotor to effect the movement of neck portion 11 into a position where the locking bolt is protrusible, the bolt 4 is held to its retracted position, being engaged with the pin 16 at its recess 15. However, when the driver leaves vehicles by opening the door 21, the switch 20 is temporarily closed to energize the solenoid 17 to effect the attraction of the pin by the solenoid, whereby said pin is moved towards the spring 18 against its repulsive force and the engagement of said pin with the recess 15 is released. The locking bolt 4, thereby, becomes free to protrude towards the steering shaft $a$ by the action of the spring 7 to effect the locking of said shaft.

Figure 3:
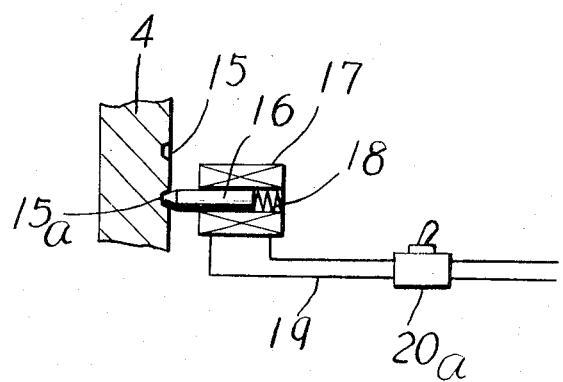
FIG. 3 is an enlarged explanatory view showing another embodiment of the switch which actuates the electromagnetically operable means.

In FIG. 3 in which those parts corresponding to those illustrated in FIGS. 1 and 2 are indicated by the same numerals, another embodiment of switch which actuates the electromagnetically operable pin 16 is illustrated. To the solenoid circuit 19, there is provided a secret switch 20a. And, in addition to the recess 15, there is provided on the locking bolt 4 another recess 15a which is engageable with the pin 16 when the bolt 4 is at its protruded position. When the switch 20a is made closed after rotating the rotor 9 to its locking position and/or withdrawal of the key 14 from the rotor, the locking bolt is brought into its protruded position, as explained above in connection with FIGS. 1 and 2. And, when said secret switch is made open, the pin 16 comes into engagement with the recess 15a of the protruded locking bolt so as to ensure the unreleasable locking engagement of bolt with the steering shaft, in co-operation with the spring 7. In this embodiment illustrated in FIG. 3 and explained above, it is necessary, for the operation of rotating the rotor to a position other than the locking position, to make the secret switch 20a closed, in advance of said operation, to make the pin 16 retract from the recess 15a.

What is claimed is:

1. In a theft preventing device for motor vehicles of the kind in which a locking bolt of a lock of the cylinder type connected to an ignition switch which is operable to various positions with the rotation of rotor of the lock, is brought from its retracted position into its protruded position, with the rotation of rotor into its locking position, where the forward end of locking bolt comes into the locking engagement with a vital part of vehicles such as steering shaft; an improvement comprises means normally biased by spring means towards the locking bolt for holding said bolt at its retracted position by its engagement with the locking bolt, said engagement is releasable by energizing an electromagnetic device which overcomes the biasing force of spring means exerting upon the first-mentioned means when it is energized by closing a switch provided to a circuit connected to said electromagnetic device.

2. A theft preventing device as claimed in claim 1, in which said means is a pin engageable with a recess provided to a lateral side of the locking bolt, and said switch is made closed by the opening of a door.

3. A theft preventing device as claimed in claim 1, in which said means is a pin engageable with a recess provided to a lateral side of the locking bolt, said electromagnetic device is a solenoid accommodating a part of said pin, and said switch is closed by the opening operation of a door.

4. A theft preventing device as claimed in claim 1, in which said means is a pin selectively engageable with either one of recesses provided to the locking bolt, the engagement of said pin with one of said recesses keeping the locking bolt to its retracted position and the engagement of said pin with the other recess keeping the bolt to its protruded position.

* * * * *